US012019642B2

United States Patent
Boduroglu et al.

(10) Patent No.: US 12,019,642 B2
(45) Date of Patent: Jun. 25, 2024

(54) DISTRIBUTED QUERY TECHNIQUE TO EFFICIENTLY RETRIEVE AND MERGE DATA FROM MULTIPLE SHARDS

(71) Applicant: Microsoft Technology Licensing, LLC, Redmond, WA (US)

(72) Inventors: Tahsin Murat Boduroglu, Seattle, WA (US); Ahmed Hassan Mohamed, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/985,568

(22) Filed: Nov. 11, 2022

(65) Prior Publication Data

US 2024/0160635 A1    May 16, 2024

(51) Int. Cl.
*G06F 16/2458* (2019.01)
*G06F 16/248* (2019.01)
*G06F 21/16* (2013.01)
*G06F 21/10* (2013.01)

(52) U.S. Cl.
CPC ........ *G06F 16/2471* (2019.01); *G06F 16/248* (2019.01); *G06F 21/16* (2013.01); *G06F 21/1063* (2023.08)

(58) Field of Classification Search
CPC .... G06F 16/2471; G06F 16/248; G06F 21/16; G06F 21/1063
See application file for complete search history.

(56) References Cited

U.S. PATENT DOCUMENTS

| 8,230,070 B2 | 7/2012 | Buyya et al. |
| 8,924,426 B2 | 12/2014 | Chattopadhyay et al. |
| 9,171,044 B2 | 10/2015 | Schleimer et al. |
| 9,619,545 B2 | 4/2017 | Hardy et al. |
| 9,805,108 B2 | 10/2017 | Merriman et al. |

(Continued)

FOREIGN PATENT DOCUMENTS

| EP | 4064066 A1 | 9/2022 |
| WO | 2007079303 A2 | 7/2007 |

OTHER PUBLICATIONS

"Spark Streaming Programming Guide", Retrieved From: https://spark.apache.org/docs/latest/streaming-programming-guide.html, Retrieved On: Aug. 18, 2022, 20 Pages.

(Continued)

*Primary Examiner* — Cheyne D Ly

(57) ABSTRACT

Systems and methods for efficiently querying distributed data are disclosed. An example method includes receiving a query from a device; transmitting the query to multiple distributed data stores; receiving, from the data stores, first data items satisfying the query; generating first-page results from the first data items; based on the first-page results, generating a first-page watermark; transmitting the first-page results and the first-page watermark to the device; receiving a second-page request from the device, the second-page request including the query and the first-page watermark; transmitting the query and at least a portion of the first-page watermark to the data stores; receiving, from the data stores, second data items satisfying the query and the portion of the first-page watermark; generating second-page results from the received second data items; and transmitting the second-page results to the device.

18 Claims, 12 Drawing Sheets

(56) References Cited

U.S. PATENT DOCUMENTS

| | | |
|---|---|---|
| 2006/0129540 A1 | 6/2006 | Hills et al. |
| 2007/0185858 A1* | 8/2007 | Lu .................. G06F 16/951 |
| | | 707/999.005 |
| 2008/0301456 A1* | 12/2008 | Staring ............ H04N 21/8358 |
| | | 713/176 |
| 2015/0006492 A1* | 1/2015 | Wexler .............. G06F 16/248 |
| | | 707/694 |
| 2017/0262516 A1 | 9/2017 | Horowitz et al. |
| 2018/0089278 A1 | 3/2018 | Bhattacharjee et al. |
| 2020/0073866 A1 | 3/2020 | Joyner et al. |
| 2021/0056095 A1 | 2/2021 | Srivastava |
| 2023/0133522 A1* | 5/2023 | Zhao .................... G06N 20/00 |
| | | 707/769 |

OTHER PUBLICATIONS

Bakli, et al., "Distributed Mobility Data Management in MobilityDB", In Proceedings of 21st IEEE International Conference on Mobile Data Management (MDM), Jun. 30, 2020, 2 Pages.

Kim, et al., "Does Selective Search Benefit from WAND Optimization?", In Proceedings of European Conference on Information Retrieval, Mar. 20, 2016, pp. 145-158.

Kim, et al., "Efficient Distributed Selective Search", In Journal of Information Retrieval, vol. 20, Issue 3, Jun. 20, 2017, pp. 221-252.

Kranas, et al., "Parallel Query Processing in a Polystore", In Journal of Distributed and Parallel Databases, vol. 39, Issue 4, Dec. 2021, pp. 939-977.

International Search Report and Written Opinion received for PCT Application No. PCT/US2023/033771 mailed on Jan. 3, 2024, 16 pages.

\* cited by examiner

DISTRIBUTED QUERY TECHNIQUE TO EFFICIENTLY RETRIEVE AND MERGE DATA FROM MULTIPLE SHARDS

BACKGROUND

Electronic data storage continues to grow at a significant pace. As the data that needs to be stored continues to increase, the locations of where that data is stored also continues to grow. For instance, data may be distributed across multiple data stores or database shards. Retrieving such distributed data, however, becomes substantially more difficult and prone to errors due to the lack of centralized storage.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

The currently disclosed technology, among other things, provides for distributed query techniques to efficiently retrieve and merge data from multiple data stores, such as database shards. Rather than maintaining a large cache of results received from the multiple data stores to provide subsequent pages of results, the disclosed technology utilizes a watermark that is returned with the first set of results to the client, such as a first page of results. The watermark indicates the results that have been delivered thus far for the current page of results. When a next page of results is requested, the watermark is returned with the query and processed in a manner where the results that have not been previously delivered to the client are retrieved from the distributed data stores. Accordingly, subsequent page requests do not need to be cached, which reduces the consumption of computing resources for the query process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

Figure 1:
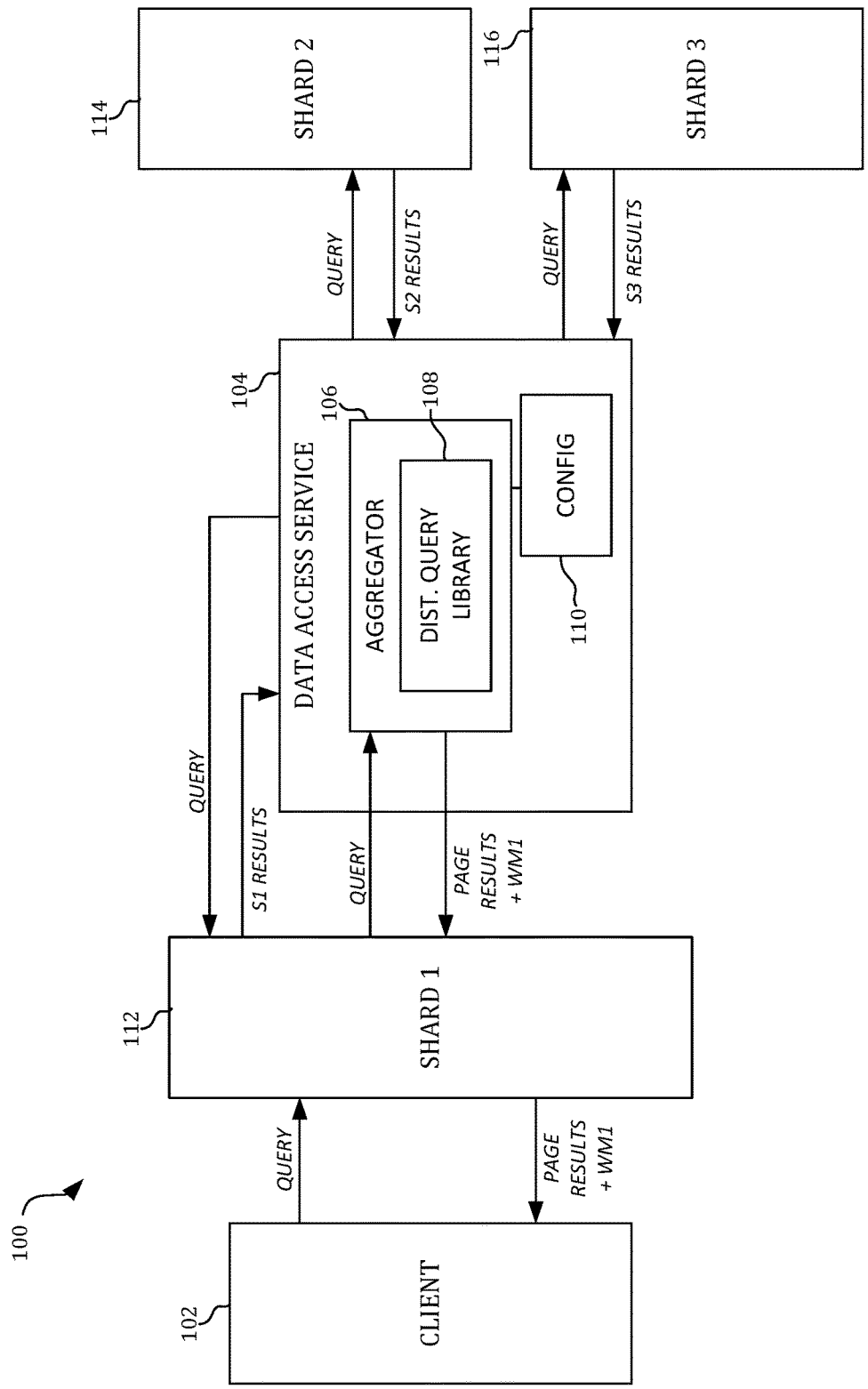
FIG. 1 depicts an example system and data flow for a distributed query.

The following detailed description refers to the accompanying drawings. Wherever possible, the same reference numbers are used in the drawing and the following description to refer to the same or similar elements. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the technology, but instead, the proper scope of the technology is defined by the appended claims. Examples may take the form of a hardware implementation, or an entirely software implementation, or an implementation combining software and hardware aspects. The following detailed description is, therefore, not to be taken in a limiting sense.

As briefly discussed above, the amount of electronic data generated continues to grow at a rapid pace. This increased amount of data also must be stored efficiently. In the past, data may have been stored in a single location, such as a centralized database. With a centralized database, retrieval of the data may be somewhat straightforward in many cases because all data is housed in one location. With modern technology, however, data storage is distributed across many data stores and/or database shards. Retrieval of data from such a distributed storage system becomes more difficult-particularly when 100% data retrieval accuracy must be achieved. For instance, generating a single result set from multiple distributed data stores generally faces multiple technical problems. As an example, one technical problem includes keeping the correct sort order for the result set when the results are merged from the multiple data stores. Another technical problem includes providing pagination support for the merged data. Yet another technical problem includes tracking the location for each data store for the next page.

In addition, some techniques for retrieving data from distributed data stores requires a state to be maintained by the data stores themselves or a large cache of results to be utilized to maintain the state of query results. Such techniques require substantial storage availability for the cache and also utilize large amounts of bandwidth in delivering the results into the cache even if those results may never be used or displayed.

The currently disclosed technology, among other things, provides for distributed query techniques to efficiently retrieve and merge data from multiple data stores, such as database shards. Rather than maintaining a large cache of results received from the multiple data stores to provide subsequent pages of results, the disclosed technology utilizes a watermark that is returned with the first set of results to the client, such as a first page of results. The watermark indicates the results that have been delivered thus far for the current page of results. When a next page of results is requested, the watermark is returned with the query and processed in a manner where the results that have not been previously delivered to the client are retrieved from the distributed data stores. Accordingly, subsequent page requests do not need to be cached, which reduces the computing resources consumed by the query process.

FIG. 1 depicts an example system 100 and data flow for a distributed query. The system 100 includes a client device 102 and a data access service 104, which may be in the form of a server that is remote from the client device 102. In other examples, the data access service 104 may be on the save device as the client device 102. The data access service 104 includes an aggregator 106 with a distributed query library 108 and a set of configuration data 110. The system 100 also includes multiple data stores represented as database shards, including a first shard 112 a second shard 114, and a third shard 116.

When a query is executed by the client device 102, the query is generated by the client device 102 and transmitted to one of the database shards or directly to the data access service 104. In the example depicted in FIG. 1, the query is transmitted from the client device 102 to the first shard 112. The first shard 112 may determine whether the query should be processed as a distributed query where other shards should be queried for results. For instance, if the first shard 112 determines that results to the query may exist in other shards and therefore should be treated as a distributed query, the first shard 112 then passes the query to the data access service 104. If the first shard 112 determines that results to the query do not exist in other shards and therefore should not be treated as a distributed query, the first shard 112 processes the query and returns results to the query. In other examples, however, the query may be sent from the client device 102 directly to the data access service 104. The data access service 104 may process the query to identify the possible data stores (e.g., shards) where the data satisfying the query may be stored. Such information regarding available shards may be stored in the distributed query library 108 and/or may be modified or updated within the configuration data 110.

The data access service 104 then transmits the query to the identified shards. In the example depicted, the query in transmitted to the first shard 112, second shard 114, and the third shard 116. Each of the shards process the query and return results to the query to the data access service 104. The aggregator 106 of the data access service 104 aggregates and merges the query results received from the shards 112-116. Additional details regarding the aggregation and merging process of the results are discussed below with respect to FIG. 3.

A first page of the merged results is then transmitted to the client device 102. The first page of the merged results may be transmitted to the first shard 112, which then relays the first page of the merged results to the client device 102. The size of the page (e.g., the number of results provided per page) may be indicated in the query and/or configured and stored within the configuration data 110. The first page of the merged results is then displayed and/or otherwise processed by the client device 102.

In addition to the first page of merged results, a first watermark (represented as WM1) is also transmitted to the client device 102. The first watermark effectively serves as a bookmark for the distributed query results to allow for a second page of query results to be retrieved upon a second page request without the data access service 104 having to maintain a state of the distributed query, as discussed further below. For example, with the present technology, the second page of results does not need to be stored (e.g., in a cache) within the data access service 104 or the client device 102. Thus, in some examples, when the first page of results is transmitted to the client device 102, any remaining results that have been received from the first shard 112, the second shard 114, and/or the third shard 116 that were not delivered in the first page are cleared from memory of the data access service 104.

As an example, the first watermark includes a filter portion that causes the already delivered results (e.g., the first page of results) to be filtered from any future results (e.g., for subsequent pages) that are obtained from the database shards 112-116. In some examples, a filter portion may not be sufficient to eliminate duplicate results while also ensuring 100% accuracy in the results that are returned. Accordingly, in some examples, a skip portion may also be included in the watermark that indicates a number of data items that are to be skipped when merging the results from the shards 112-116, as discussed further below.

Figure 2:
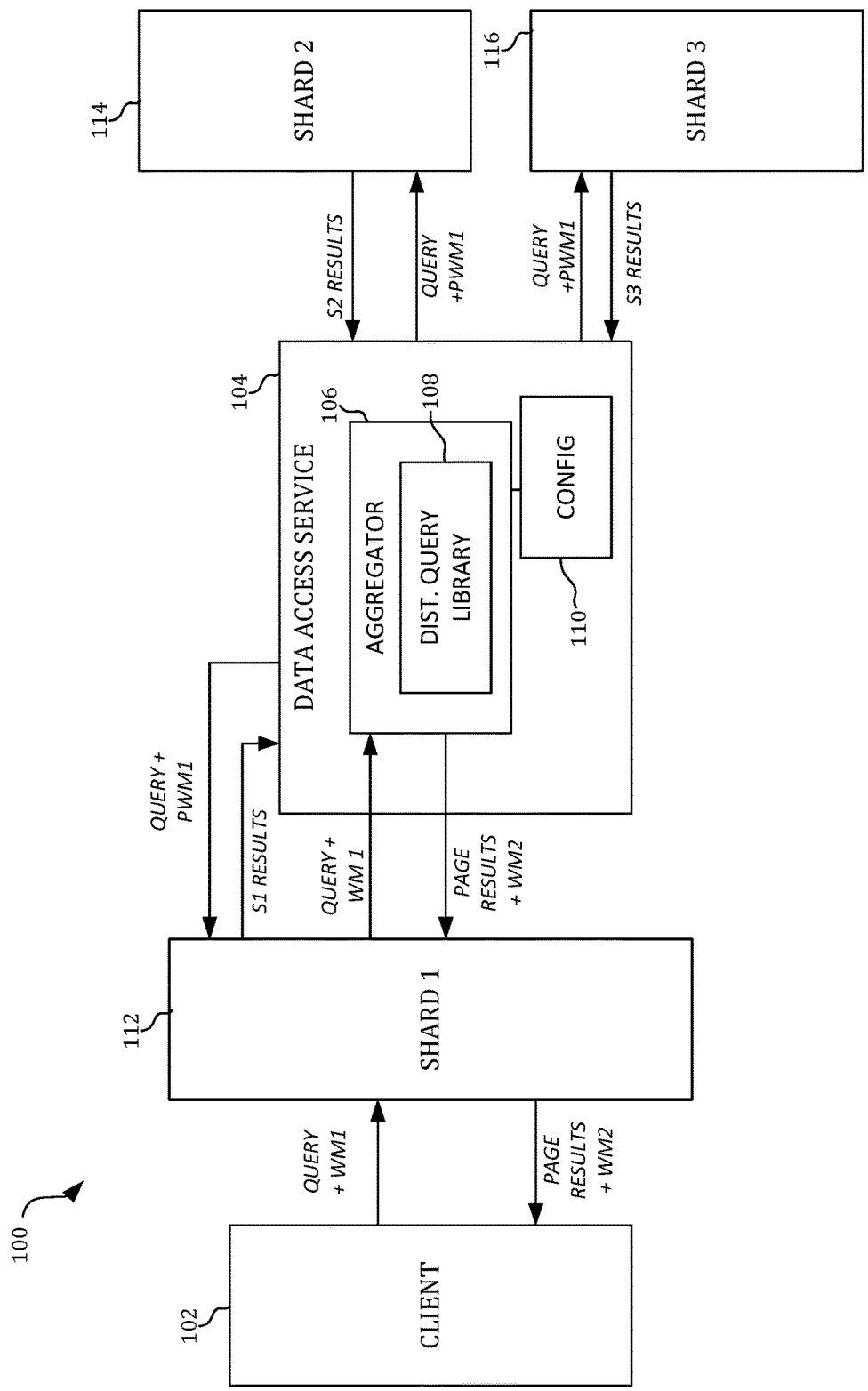
FIG. 2 depicts the example system of FIG. 1 and a data flow for providing a second page of results for the distributed query.

FIG. 2 depicts the example system 100 of FIG. 1 and a data flow for providing a second page of results for the distributed query. After the first page of the merged results are received by the client device 102, the second page of the search results may be desired by the client device 102 and/or the user of the client device. In examples where the first page of results is displayed by the client device, a request for the second page of results may be triggered by a user input, such as through the selection of a "Next Page" element or a second-page element. The request for the next page of merged results is generated or formed as the original query plus the first watermark received with the first page of results. For instance, the second-page request includes the same initial query along with the first watermark. While the example described herein is for a first page and second page of results, the technology applies to any subsequent series of page requests. As an example, stated more generally, a subsequent-page request includes the query of the prior-page request along with the watermark received with the prior-page results.

The second page request (e.g., the query plus the first watermark) is received by the data access service 104. The data access service 104 then processes the second page request. A first portion of the first watermark (represented as PWM1) is then attached to the query and sent to the respective database shards (e.g., first shard 112, second shard 114, and third shard 116) from the data access service 104. A second portion of the first watermark is temporarily stored by the data access service 104 for use by the data access service 104 in merging results received for the second page. For instance, as discussed further herein, each watermark may include a filter portion and a skip portion. The filter portion may be included with the query provided to the shards 112-116, and the skip portion may be retained by the data access service 104.

Each of the database shards 112-116 processes the query with the second portion of the first watermark to generate results to the query as modified by the second portion of the first watermark. The results the modified query (e.g., query+ PWM1) from each shard 112-116 are then transmitted to the data access service 104 where the aggregator 106 aggregates and merges the received results. The data access service 104 also generates a second watermark representing the results that have been delivered to the client device 102 in the second page of results. The second page of merged results is then transmitted to the client device 102 along with the second watermark (represented as WM2).

The received second page of results may then be displayed and/or otherwise processed by the client device 102. The process and data flow depicted in FIG. 2 may then repeat for subsequent page requests in the merged results. For instance, a third-page request may be transmitted from the client device 102 to the data access service 104, and that third-page request includes the query and the second watermark.

Figure 3:
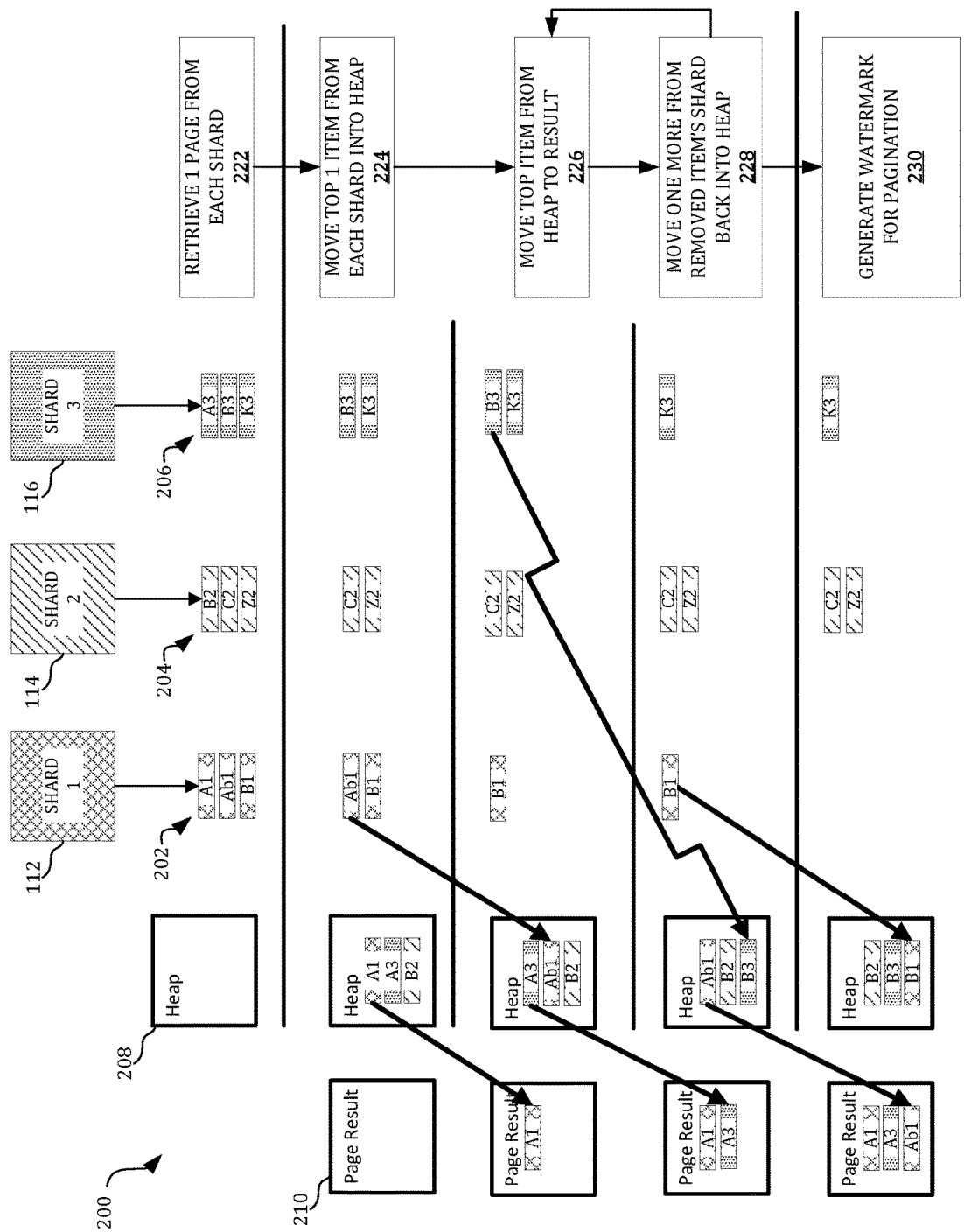
FIG. 3 depicts an example process flow for processing a distributed query.

FIG. 3 depicts an example process flow 200 for processing a distributed query. The process flow includes a representation of the first shard 112, the second shard 114, and the third shard 116. Each of the shards 112-116 includes data items that match a query received from a client device. The process flow 200 may be performed by the data access service 104 of FIG. 1.

When a query is received by a client device, at operation 222, the data access service retrieves one page of results from each of the respective shards (e.g., a number of data items equal to the page size). In the example depicted, the page size has a value of three for simplicity, and three data stores are queried (e.g., the first shard 112, the second shard 114, and the third shard 116). Retrieving the results from each of the shards 112-116 may include transmitting the query to each of the shards 112-116 along with the page size to indicate how many results are to be returned from the query.

The results from the first shard 112 are represented by first-shard results 202, results from the second shard 114 are represented by second-shard results 204, and results from the third shard 116 are represented by the third-shard results 206. The first-shard results 202 include data item A1, data item Ab1, and data item B1. The second-shard results 204 include data item B2, data item C2, and data item Z2. The third-shard results 206 include data item A3, data item B3, and data item K3.

The results that are received are ordered results and may be ordered within the database shards themselves. For instance, the query may request or specify an ordering of the data items such that the results that are returned are also ordered, and subsequent queries for subsequent pages may be accurately performed to help ensure complete and accurate results are returned. The ordering may be specified for a sort field that is a property of the data items that are to be returned.

As an illustrative example, each of the data items represented in FIG. 3 (e.g., each small rectangle) may represent contact cards that are ordered by surname of the contact. For instance, data item A1 may be a contact card "Mark Aaronson" and data item Ab1 may be a contact card for "Mary Abner." An example corresponding query may be ?$orderby=surname asc&$top=3. Such a query causes the data items to be ordered by the sort field of surname in an ascending order and return the top 3 results.

An ordered array is also initialized for handling and merging the results that are received from the shards 112-116. In the example depicted, the ordered array is in the form of a heap 208. While a heap 208 is used in the present example, other types of ordered arrays may be used in other examples. The use of the heap 208 provides an intermediate storage that allows for the data items in the results to be efficiently merged as well as for the watermarks to be generated with sufficient accuracy, as discussed further below.

With the results 202-206 from the shards 112-116 having been received, data items from the results are added to the heap 208 at operation 224. For example, the top data item from each of the results 202-206 is moved into the heap 208, where the data items are again ordered in the heap 208. Accordingly, the size of the heap 208 is equal to at least the number of shards 112-116 that are being queried. In the present example, three shards 112-116 are being queried, and thus the size of the heap 208 is equal to three. With the use of a heap 208 (rather than other data arrays), the order of newly added data items is more efficiently retained than having to fully reorder the array when new items are added.

In the example depicted, moving the top item from the first-shard results 202, the second-shard results 204, and the third-shard results 206 causes the heap to be filled with the data item A1, the data item A3, and the data item B2. The remaining data items received in the results 202-206 are held in temporary memory and processed as further described below.

At operation 226, the top result from the heap 208 is moved to the page results 210. In the example depicted, the first move or operation is to move the data item A1 to the page results 210. When a data item is removed from the heap 208 and transferred to the page results 210, the top data item from the results of the shard of the removed data item is then added to the heap 208 at operation 228. For example, when the data item A1 (from the first shard 112) is moved from the heap 208 to the page results 210, the top data item from the remaining data items from the first-shard results 202 (e.g., data item Ab1) is moved to the heap 208. When a heap 208 is used as the ordered array, the newly added data item is automatically ordered or sorted in the heap (e.g., data item Ab1 is popped into the correct ordered position in the heap 208). For other types of ordered arrays, the ordered array may need to be sorted or ordered each time a new data item is added to the ordered array.

Operation 226 and operation 228 then repeat until the number of data items in the page results 210 reaches the set value for the page size (e.g., three for this example). For instance, after data item A1 is added to the page results 210 and the data item Ab1 is added to the heap 208, the top data item from the heap 208 (e.g., data item A3) is added to the page results 210. Because the data item A3 is from the third shard 116, data item B3 is then added to the heap 208. Subsequently, the top item in the heap 208 (e.g., data item Ab1) is added to the page results 210. The page results 210 are then at the set page size (e.g., three in this example).

The use of such a process allows for the sorting and merging of data to stop as soon as possible to conserve processing resources. For instance, once a full page size for the page results 210 is achieved, the sorting and merging operations for the particular page are ceased. Accordingly, additional processing resources are conserved by stopping the processing and merging of the data items when it is no longer necessary or beneficial.

Once the page results have been filled up to the page size, the watermark is generated at operation 230 for the page for which the page results were prepared (e.g., the first page in the present example). The watermark represents a bookmark for the results that were added to the page results 210. After the watermark is generated and the page results 210 are delivered to the client device, the remaining data items that are in the heap or still remaining in the shard results 202-206 may be erased from the memory of the data access service.

Generation of the watermark involves an analysis of the heap 208 and/or the page results 210. Where the heap 208 is empty when the page results 210 is filled to the page size, then there is no next page and no watermark is generated. Accordingly, no link to a next page may be provided with the page results that are delivered to the client device (@odata.nextLink is removed from the response). Where the heap is not empty, however, a comparison between the data items in the page results 210 and the data items in the heap 208 is performed to generate the watermark.

In some examples, data sets with no known schema may be merged by using a schema agnostic comparison. As one example, JsonElement items and OData queries may be used to achieve the schema agnostic comparison (e.g., public class JsonElementComparer. IComparer<JsonElement>). The OData queries may contain nested, multi-level orderby criteria, and the JsonElement comparer accepts a collection of criteria, which each may correspond to a sort order (e.g., public JsonElementComparer(IList<ComparisonCriteria> criterias). A particular criterion may contain a JsonPath to a relevant property to be used for the comparison, the orderby direction, and/or the comparison type for String properties (e.g., public ComparisonCriteria(string path, SortDirection direction=SortDirection.Asc, StringComparison comparisonType=StringComparison.OrdinalIgnoreCase). The ordered array or heap may be a custom heap or array (e.g., public Heap(IComparer <T> comparer) that is configured to accept an IComparer may then be used to merge the data items from each set of data items received from the respective shards.

Figure 4:
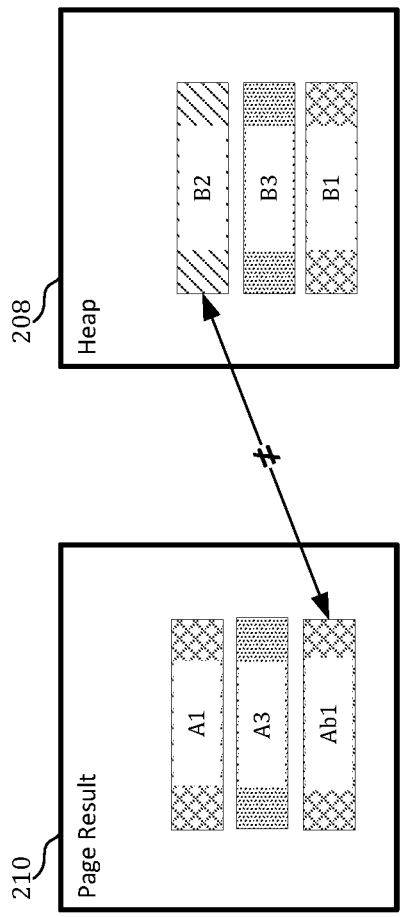
FIG. 4 depicts an example page result and heap for generating a watermark.

FIG. 4 depicts example page results 210 and heap 208 for generating a watermark. To generate the watermark, a comparison of the last data item in the page results 210 may be compared to the first or top data item in the heap 208. In the example depicted in FIG. 4, the last data item in the page results 210 does not equal the top data item in the heap 208. More specifically, the field on which the data items were sorted or ordered (e.g., surname) is not the same. In this scenario, the watermark can be generated as a filter expression for the next page request to skip all the items in the pages results 210. The watermark may include a filter term with a greater than expression that indicates a greater than the value for the sort field of the last data item in the page results 210. In the example depicted, the filter term may be filter=surname gt'Ab' which causes the results to be returned only for data items having a surname greater than Ab, which is the sort field value for the last data item in the page results 210 (e.g., data item Ab1). This watermark helps ensure that the next page request returns data items from the shards 112-116 that have surnames that start with values greater than Ab, such as surnames that start with B (e.g., data item B2). In examples where a descending sort is utilized instead of an ascending sort, the filter term may include a less-than expression rather than a greater-than expression.

Figure 5:
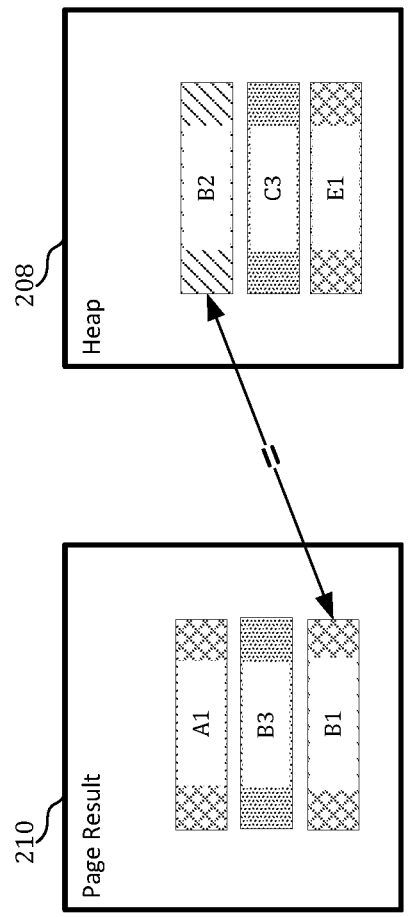
FIG. 5 depicts another example page results and heap for generating a watermark.

FIG. 5 depicts another example page results 210 and heap 208 for generating a watermark. In the example depicted in FIG. 5, the sort field value for the last data item in the page results 210 (e.g., data item B1) is the same as the sort field value for the top data item in the heap 208 (e.g., data item B2). For example, both the data item B1 and the data item B2 may be contact cards for persons having the surname "Barnes." As such, the ordering of the data items may be based on another sort field (e.g., first name) or some other default sorting criteria that is consistently applied. In such a scenario, greater-than or less-than expressions alone are insufficient as filter terms of the watermark to eliminate all the already returned items (e.g., data items already delivered as page results). Instead, because the sort order always generates a deterministic merged set (e.g., based on multiple sort criteria including unique identifiers such as an immutable ID), a greater-than-or-equal expression or less-than-or-equal expression in addition to skip count may be used for the filter term.

The skip count is equal to the number of items sharing the same sort field value that have already been returned in page results 210. In the example depicted, the data items B3, B1, and B2 may all be for contact cards with the surname of Barnes. Two of those data items (e.g., data items B3 and B1) have already been included in the page results 210. Thus, the skip count is equal to two. In such an example, the watermark may have two portions: (1) a greater-than-or-equal or less-than-or-equal expression and (2) a skip count (also referred to as a skip token). An example watermark may be as follows: filter-surname ge 'B' & skip=2.

Upon a next-page request, the first portion of the watermark (e.g., filter=surname ge 'B') may then be provided to each shard 112-116 along with query. The second portion of the watermark (e.g., the skip token) is retained by the data access service rather than provided to the shards. The skip token is then used when building the heap. A number, equal to the skip token value, of the top data items in the heap are then skipped or removed. In the example depicted, the first two data items in the heap are skipped and the heap continues to be built without the first two data items.

To prevent edge case scenarios where a dominant shard may contain the majority of the data items for the next page, the page size for data items requested by the shards may also be increased by the value of the skip token. For example, if the page size is three and the value of the skip token is 2, five data items are retrieved from each shard for generating the next-page results. While this approach causes additional items to be queried from each shard and then skipping of the unnecessary items, there is still a benefit in latency as compared to the use of a cache of results that may cause extra hop latency and cache-eviction use cases.

In some examples, rather than using a skip count, additional sort or filter criteria may be built into watermark. Where there are multiple data items having the same value for the sort field (e.g., the surname field), the data item are often still distinguishable from one another based an additional fields or data within the data item. For instance, the data item may have a unique ID that provides a default ordering when the sort field values are the same. The watermark may then be generated indicating the value for the additional field (e.g., unique ID field) of the data item that is the last data item in the page results 210. As an example, where the last data item in the page results 210 has a surname of "B" and a unique ID of "42", the watermark may be: filter=(surname eq 'B' and id gt 'xyz'). Thus, the watermark includes a filter term for the sort field and a filter term for an additional field as well that distinguishes the last data item in the page results from the top data item in the heap 208. In some examples, more than one additional data field may be needed to distinguish the last data item in the page results 210 from the top item in the heap 208. In such examples, the watermark may include a filter term for the sort field along with filter terms for multiple additional fields.

Figure 6:
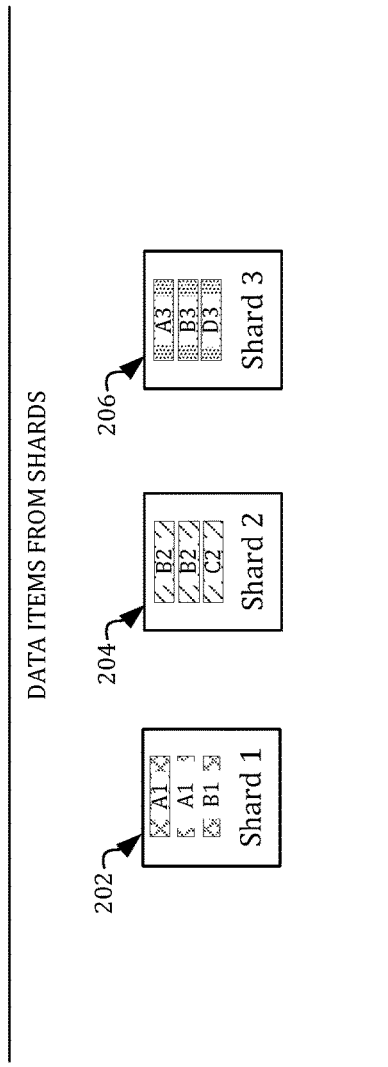
FIGS. 6-8 depict examples for generating query results for multiple pages according to examples of the disclosed technology.
Figure 6:
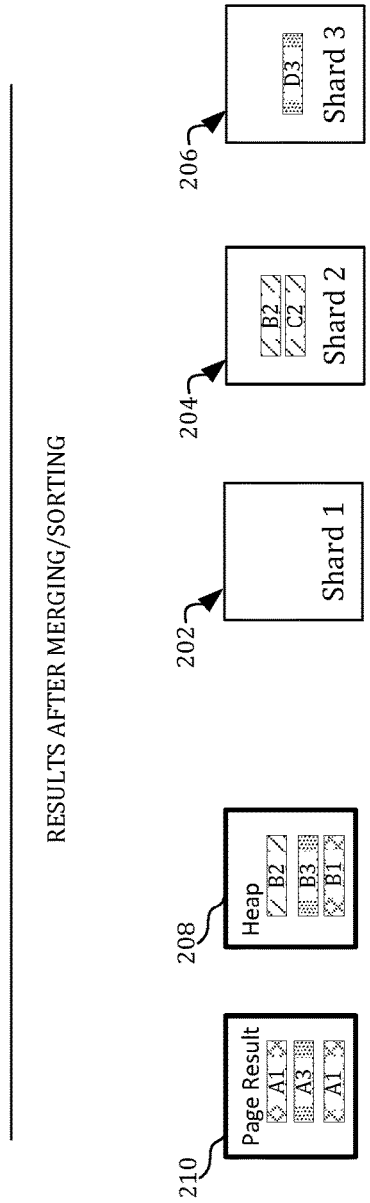
Figure 7:
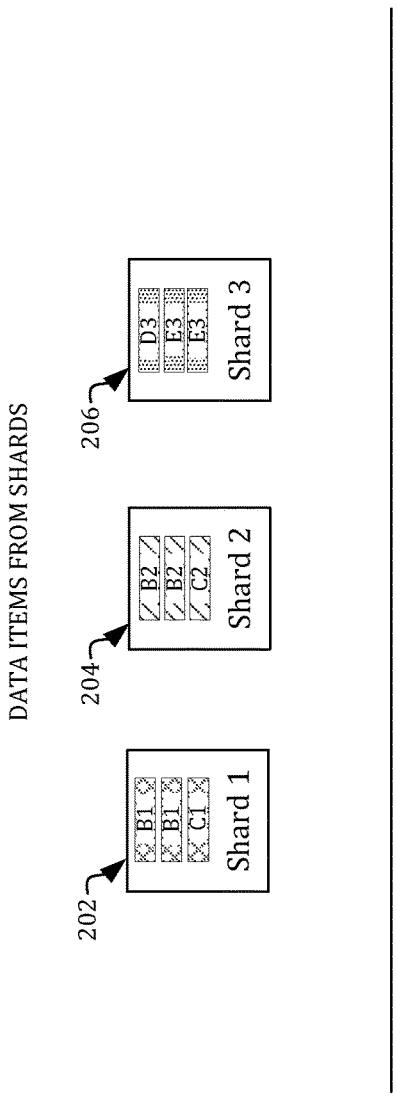
Figure 7:
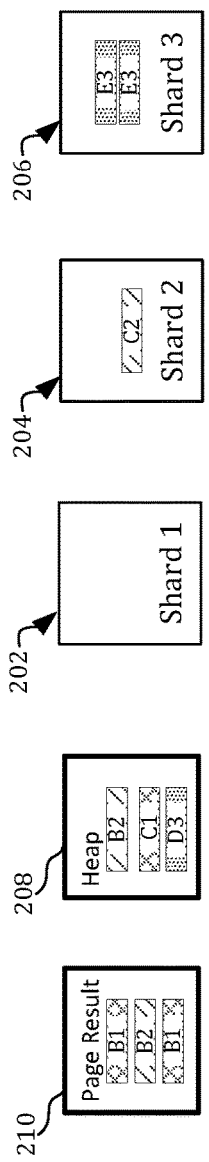
Figure 8:
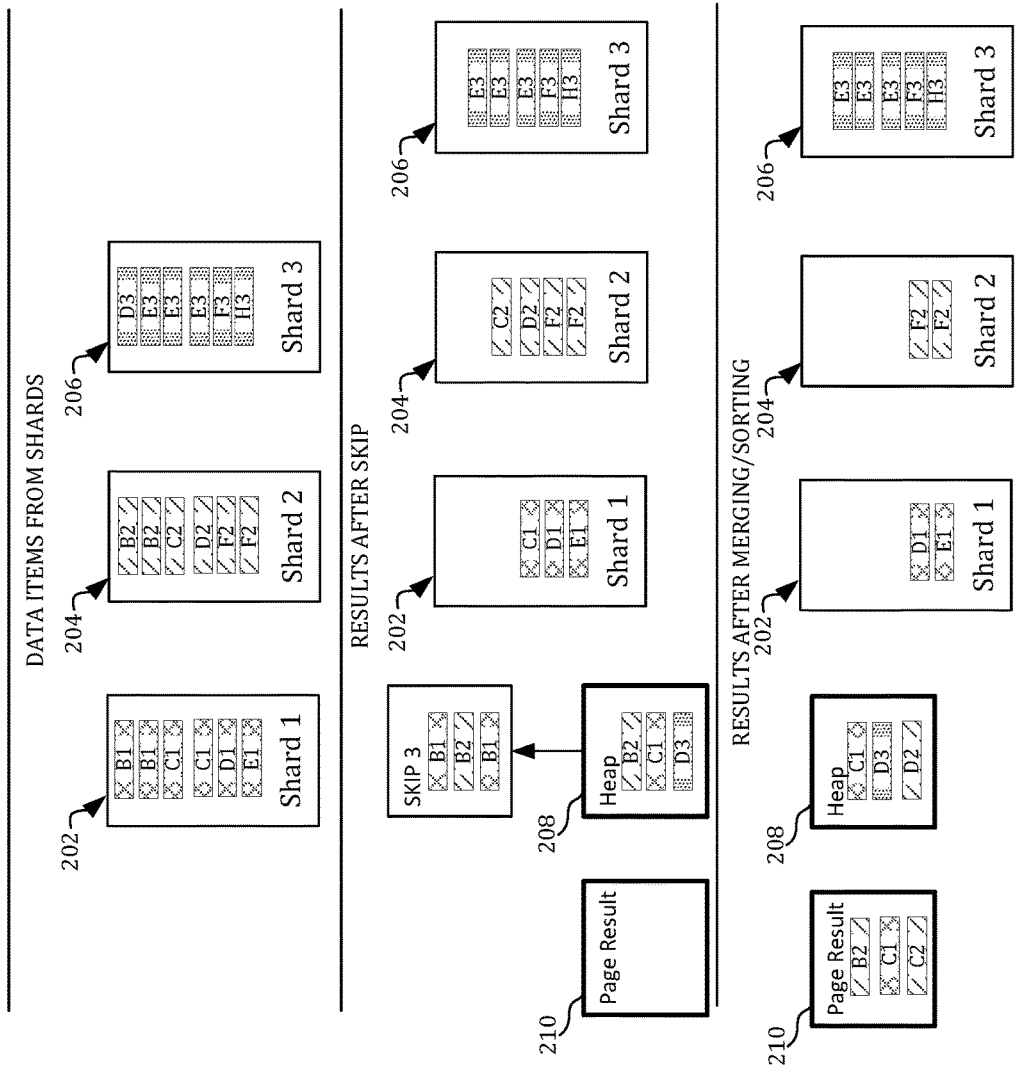

FIGS. 6-8 depict examples for generating query results for multiple pages according to examples of the disclosed technology. FIG. 6 depicts example results received from three different shards according to the example query of ?$orderby=surname asc&$top=3. Accordingly, three data items are returned in first-shard results 202, second-shard results 204, and third-shard results 206. Similar to the examples discussed above, the data items represent contact cards and the alphabetical representations (e.g., "A" in "A1") represent the surname of the contact card. In the present example, each data item marked with an A represent contact cards having the same surname. Similarly, each data item marked with a B represent contact cards having the same surname, and so forth.

After performing the merging/sorting process discussed above with reference to FIG. 3, data items are populated into the page results 210 and the heap 208 as shown in the lower section of FIG. 6. The first-page watermark generated for the example depicted is: filter=surname gt 'A'", skip: 0. Because the last data item in the page results 210 has a different surname than the first data item in the heap 208, the skip count is zero (or the skip portion may be omitted) and the filter portion of the watermark uses a greater-than expression. The page results 210 for the first page are then returned to the client device along with the first-page watermark.

When a request from the client device for the second page is received, the client device may provide the following example query with the original query concatenated with the first-page watermark: ?$orderby=surname asc&$top=3&skipToken={filter: "filter=surname gt 'A'", skip: 0}. The query and the filter portion of the watermark (e.g., filter=surname gt 'A'") is provided to each of the shards, and the results received are depicted in the upper portion of FIG. 7. Again, three data items are returned from the shards in each of the first-shard results 202, the second-shard results 204, and the third-shard results 206. The data items returned, however, all have a surname value greater than A.

After performing the merging/sorting process discussed above with reference to FIG. 3, data items are populated into the page results 210 and the heap 208 as shown in the lower section of FIG. 7. The second-page watermark generated for the example depicted is filter=surname ge 'B'", skip: 3. Because the last data item in the page results 210 has the same surname value as the first result in the heap 208, the skip value is no longer zero and the filter portion of the watermark is a greater-than-or-equal expression rather than a greater-than expression. The page results 210 for the second page are then returned to the client device along with the second-page watermark.

When a request from the client device of the third page is received, the client device may provide the following example query with the original query concatenated with the second-page watermark: ?$orderby=surname asc&$top=3&skipToken={filter: "filter=surname ge 'B'", skip: 3}. The query that is then provided to the shards includes the original query and the filter portion of the watermark (filter=surname ge 'B'). The number of results requested is also increased from the original query, which was based on the page size, by the value for the skip portion of the watermark. The skip portion of the second-page watermark is also retained by the data access service for adjustment to the heap 208 when formed.

In the present example, because the page size was three and the value for the skip portion of the second-page watermark is three, the number of data items returned from each shard is six. Accordingly, each of the first-shard results 202, the second-shard results 204, and the third-shard results 206 includes six data items having surnames greater than or equal to B, as shown in FIG. 8. When the heap 208 is then formed, the top three (i.e., the value of the skip portion of the watermark) data items in the heap 208 are skipped and the merging process then continues by refilling the heap 208. The results after the skip has been performed are shown in the middle of FIG. 8.

After performing the merging/sorting process discussed above with reference to FIG. 3, data items are populated into the page results 210 and the heap 208 as shown in the lower section of FIG. 8. The third-page watermark generated for the example depicted is "filter=surname ge 'C'", skip: 2. Because the last data item in the page results 210 has the same surname value as the first result in the heap 208 and two of those data items are in the page results 210 (e.g., data item C1 and data item C2), the skip value is two and the filter portion of the watermark is a greater-than-or-equal expression rather than a greater-than expression. The page results 210 for the third page are then returned to the client device along with the third-page watermark.

While in the above examples each of the shards continued returning results for each subsequent page request, that may not always be the case. For instance, the data items may not be uniformly distributed across the shards and some shards may return zero items. When a shard returns zero data items for a particular page request, that shard will no longer be queried for subsequent page requests. Because the disclosed technology may be stateless and not cache such data about prior page requests, the watermark may include data regarding shards that did or did not return data items for the particular page request. For example, the watermark may include a bit array that corresponds to each of the shards that were queried and the status of the response (e.g., results returned or results not returned). The use of such a bit array may require a consistent order of shards being queried by the data access service. In some examples, the bit array may be converted to a byte array prior to serialization for compression.

Null values in the sort field of data items may also be handled by the technology disclosed herein. For example, where the different data stores or shards may have no schema enforcement, there is no guarantee that all fields or properties of the data item will have a defined value for every data item in the shard. The disclosed technology provides for an approach that handles null values across many different types of data by appending an additional filter before querying the shards. Without handing null values in some manner, the ultimate result set may miss certain items that otherwise should have been included.

As an example, simply appending $filter=surname gt B to a query may skip all data items where the surname field is null. This may create an incomplete set of data items. To overcome this problem, the filter portion of the watermark may be built with a nullable expression, such as $filter=(surname gt B or surname eq null).

In an ascending order, the null value precedes any non-null value. Accordingly, the first results received from each shard may include null sort fields. Nevertheless, the same merge and sort process discussed above to generate the heap and the page results may be performed. Once the merge and sort process (e.g., the process discussed regarding FIG. 3) is performed, the data items in the filled page results and heap are analyzed or compared. In an ascending order, if the value of the last data item of the result set is not null, there will not be a null value in any of the subsequent pages. If the value of the last item of the result set is null, there might be a null value in the next page. For instance, for a page size of three, if the page results are entirely filled with data items having null sort field values, the following watermark may be generated: filter=(surname eq null) & skip=3. This process may continue for as many page results of null values that are identified.

For a descending order, the null values will appear at the end rather than the beginning of the results. In such examples, if the value of the sort field for the last data item of the result set is null, there will only be null values on the rest of the pages. If the value of the sort field for the last data item of the result set is no null, there might be a null value in a subsequent page. Accordingly, if the page results include data items with all non-null sort field values, the watermark may be described above and include the nullable expression (e.g., filter=(surname lt 'B' or surname eq null)). If the last data item in the page results is null, the value for the skip portion of the generated watermark may be equal to the number of data items in the page results that have the null value for the sort field.

Figure 9:
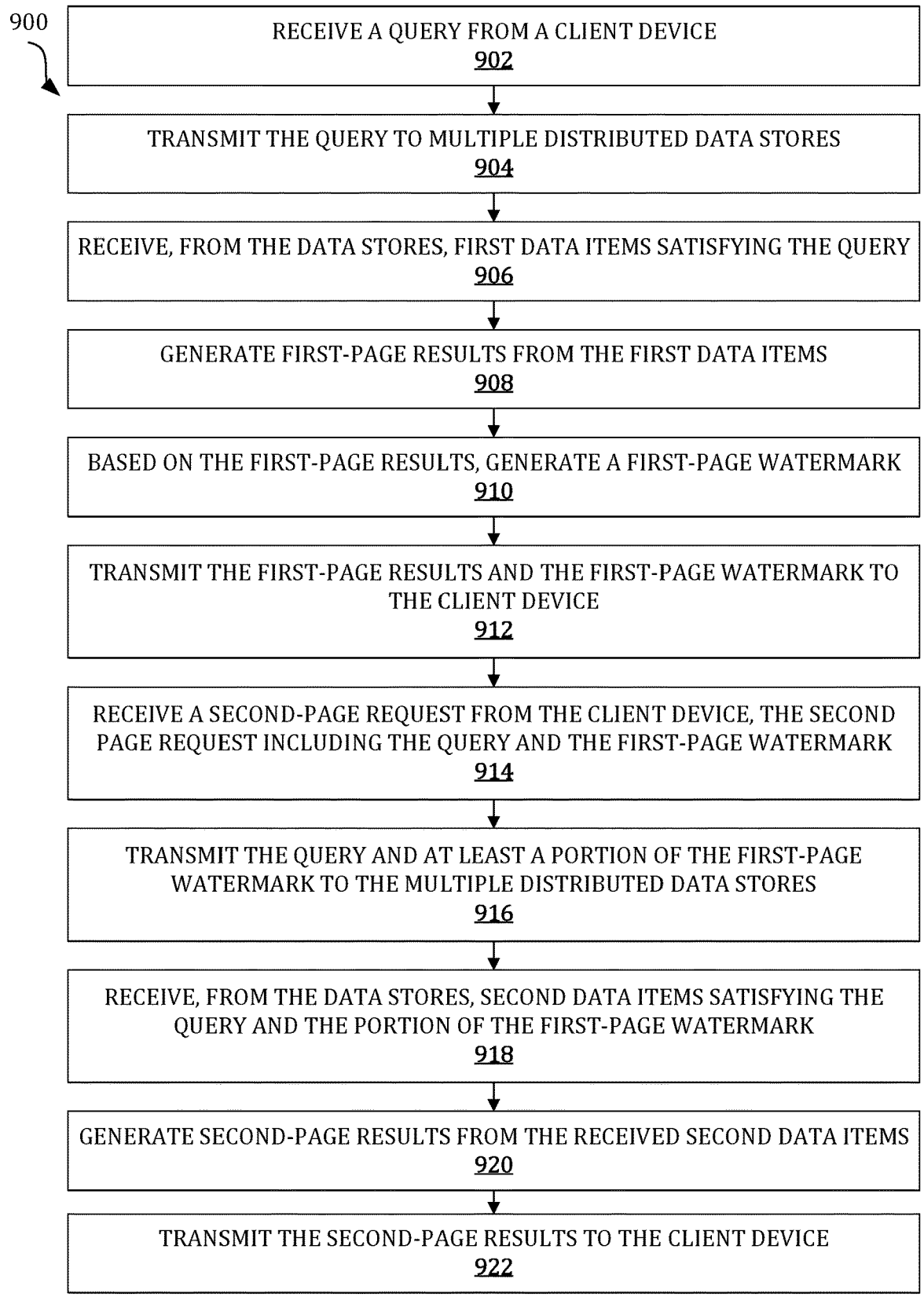
FIG. 9 depicts an example method for efficiently querying distributed data.

FIG. 9 depicts an example method 900 for efficiently querying distributed data. The method 900 may be performed by a computing device, such as a server operating a data access service. In other examples, the method 900 may be performed by one or more additional or alternative computing devices.

At operation 902 a query for data items stored across multiple data stores is received from a client device. The query may be received directly from the client device or via a data store. The query indicates at least one sort field for which the requested data is to be sorted. For example, the sort field may be for a particular property or parameter of the respective data items, such as the "surname" property discussed in the examples above. In some examples, the query also includes the page size for each page to be returned.

At operation 904, the received query is transmitted to multiple data stores. The page size is also transmitted with the query or may be included in the query. As discussed above, the page size may be received from the client device as part of the query. In other examples, the page size may be a default page size or a page size configured at the data access service.

The data stores process the query and generate first data items satisfying the query. The number of data items that are generated is less than or equal to the page size. If a particular data store has more data items satisfying the query than the page size value, the number of data items is limited to the page size. As such, the number of data items that must be transmitted from each of the data stores is substantially limited, resulting in a conservation of bandwidth. At operation 906, the first data items satisfying the query are received from each of the data stores to which the query was transmitted.

At operation 908, first-page results are generated for the first data items received from the multiple data stores. The first-page results may be generated using the techniques and processes described herein, such as the process described above with respect to FIG. 3. At operation 910, based on the first-page results, a first-page watermark for the first page is generated. The first-page watermark may be generated using the techniques described herein, such as the process described above with respect to FIGS. 4-5 and/or the process described below with respect to FIG. 10. For instance, where a heap is used to generate the first-page results, generating the watermark may include a comparison of the last data item in the first page results to the top result remaining in the heap. The first-page results and the first-page watermark are then transmitted to the client device in operation 912. Once the first-page results are delivered to the client device, any remaining first data items that were not included in the first-page results may be erased or deleted from the temporary memory space holding such items for processing. Accordingly, the method may operate in a substantially stateless manner.

At operation 914, a second-page request is received from the client device. The second-page requests may be triggered on the client device from inputs, such as a user input, selecting a "Next Page" link. The second-page request includes the query that was received in operation 902 along with the first-page watermark.

At operation 916, the query and at least a portion of the received first-page watermark is received from the client device are transmitted to the multiple data stores. When the second-page request is received, the data access service parses the received first-page watermark to determine or extract portions of the first-page watermark. For instance, the first-page watermark may include both a filter portion and a skip portion. The skip portion is retained by the data access service, and the filter portion is transmitted with the query to the multiple data stores. The query including the portion of the first-page watermark may be referred to as a modified query. Where there is no skip portion in the first-page watermark (or the skip count value is zero), the modified query requests a number of data items from each data store equal to the page size. Where there is a non-zero value for the skip portion of the first-page watermark, the modified query requests a number of data items from each data store equal to the page size plus the skip count value for the skip portion.

At operation 918, second data items satisfying the modified query (e.g., the query plus at least a portion of the first-page watermark) are received from each of the multiple shards. At operation 920, second-page results are generated form the received second data items. The second-page results may be generated as discussed above with reference to at least FIG. 3 and FIGS. 6-8. For instance, a heap may be initialized and a first number of data items added to the heap may be skipped according to the value of the skip portion of the first-page watermark (in examples where the first-page watermark includes a skip portion). In examples, where there are still remaining data items received from the data stores that have not been included in the second-page results, a second-page watermark is also generated. The second-page watermark may be generated in a similar manner as the first-page watermark. For instance, the second-page watermark may be based on a comparison of the last data item in the second-page results and the top data item in the heap. At operation 922, the second-page results are delivered to the client device along with the second-page watermark, if a second-page watermark was generated.

Figure 10:
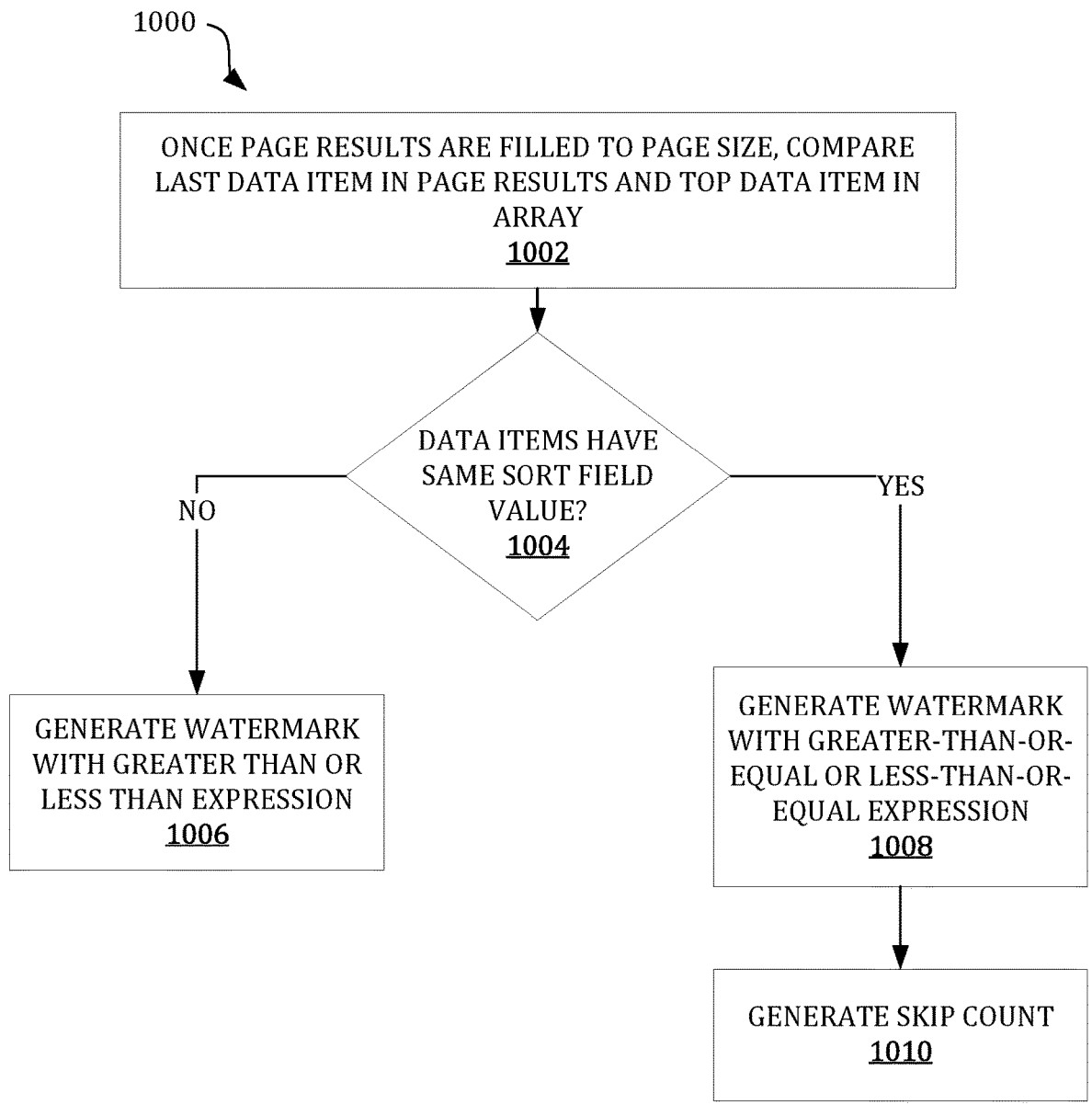
FIG. 10 depicts an example method for generating a watermark.

FIG. 10 depicts an example method 1000 for generating a watermark. The method 1000 may be performed by a computing device, such as a server operating a data access service. In other examples, the method 1000 may be performed by one or more additional or alternative computing devices.

At operation 1002, once the page results are filled with data items equal to a value of the page size, the last data item in the page results is compared to the top item of the ordered array (e.g., the heap). For example, the value of the sort field, identified in the query, of the last data item in the page results is compared to the value of the sort field for the top data item in the ordered array.

At operation 1004, based on the comparison in operation 1002, a determination is made as to whether the value of the sort field of the last data item in the page results is equal to the value of the sort field for the top data item in the ordered array. If the two values are not equal, method 1000 flows to operation 1006. If the two values are equal, the method 1000 flows to operation 1008.

At operation 1006, a watermark is generated for the particular page for which results are being generated. The watermark includes a greater-than expression or a less-than expression. If the sort order of the page results and the ordered array is an ascending sort order, the watermark is generated with the greater-than expression. If the sort order of the page results and the ordered array is a descending sort order, the watermark is generated with a less-than expression. The value for the grater-than or less-than expression is equal to the value of the sort field of the last data item in the page results.

At operation 1008, a watermark is generated for the particular page for which results are being generated, and the watermark includes a greater-than-or-equal expression or a less-than-or equal expression. If the sort order of the page results and the ordered array is an ascending sort order, the watermark is generated with the greater-than-or-equal expression. If the sort order of the page results and the ordered array is a descending sort order, the watermark is generated with a less-than-or-equal expression. The value for the greater-than-or-equal expression or the less-than-or equal expression is the value of the sort field for the last data item in the page results.

At operation 1010, a skip count is also generated for a skip portion of the watermark. The skip count is equal to the number of the data items in the page results that have the same sort field value as the last data item in the page results.

Figure 11:
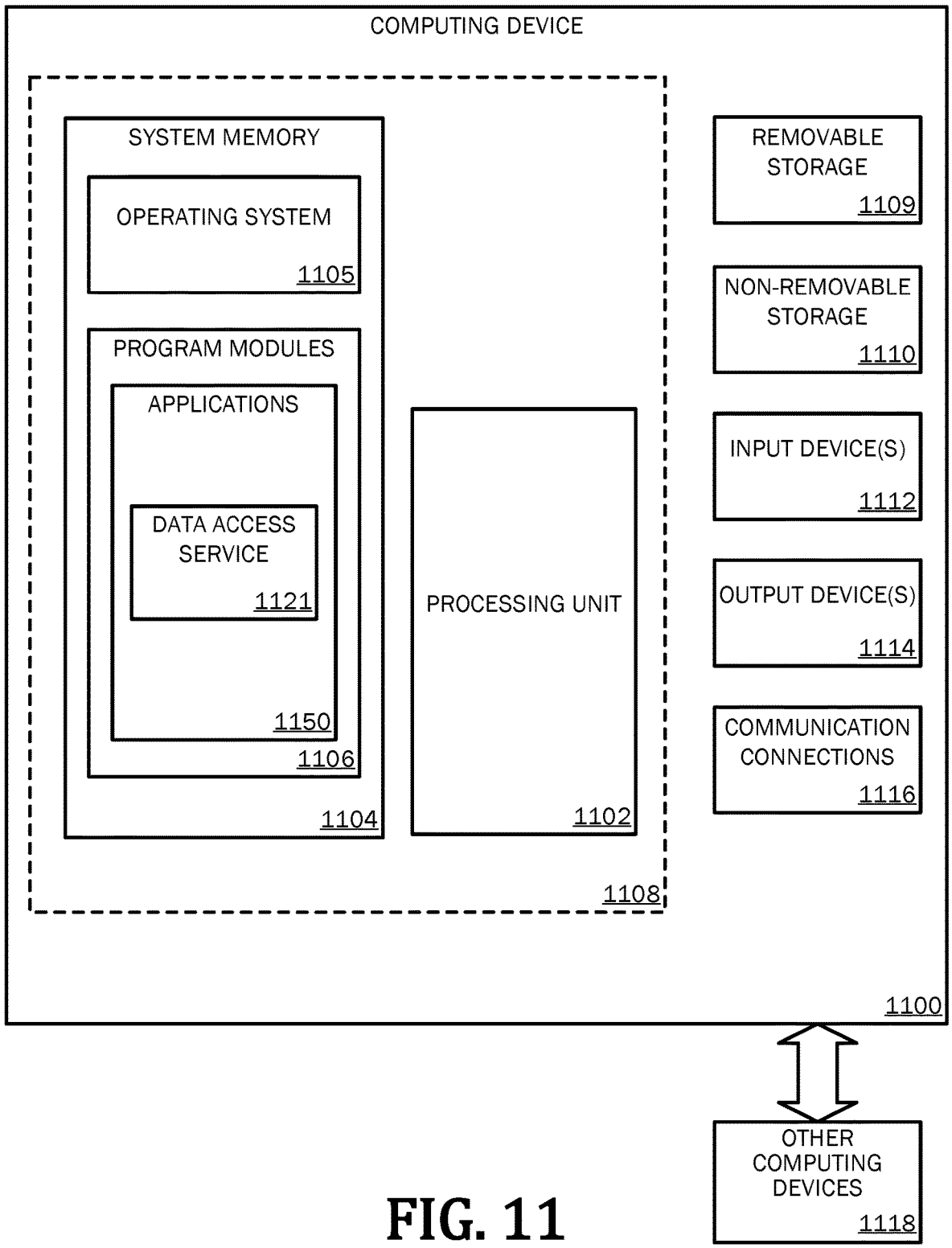
FIG. 11 is a block diagram illustrating example physical components of a computing device with which aspects of the technology may be practiced.

FIGS. 11-12 and the associated descriptions provide a discussion of a variety of operating environments in which examples of the invention may be practiced. However, the devices and systems illustrated and discussed with respect to FIGS. 11-12 are for purposes of example and illustration and are not limiting of a vast number of computing device configurations that may be utilized for practicing aspects of the invention, described herein.

FIG. 11 is a block diagram illustrating physical components (i.e., hardware) of a computing device 1100 with which examples of the present disclosure may be practiced. The computing device components described below may be suitable for a client device running the web browser discussed above. In a basic configuration, the computing device 1100 may include at least one processing unit 1102 and a system memory 1104. The processing unit(s) (e.g., processors) may be referred to as a processing system. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1150 such as a data access service 1121.

The operating system 1105, for example, may be suitable for controlling the operation of the computing device 1100. Furthermore, aspects of the invention may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 may perform processes including, but not limited to, one or more of the operations of the methods illustrated in FIGS. 7-10. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 1100 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
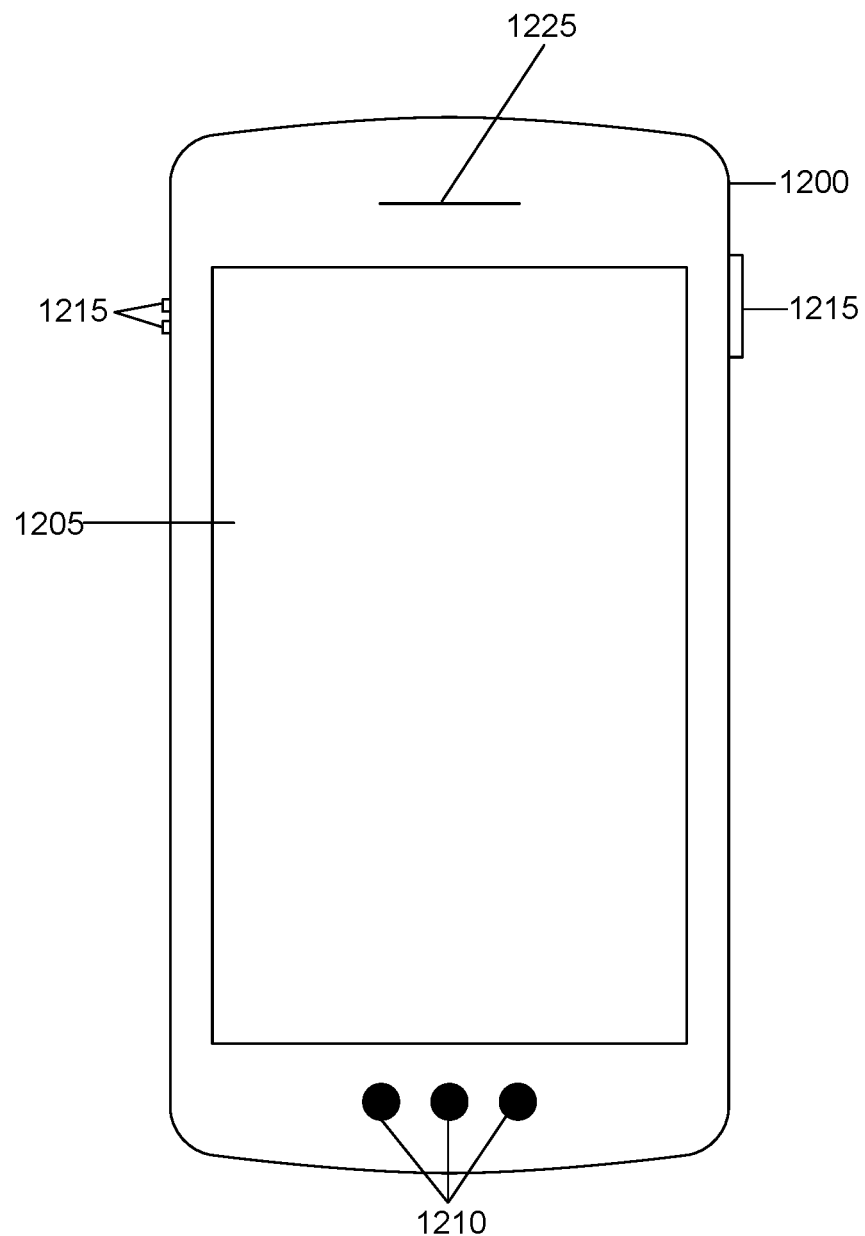
FIGS. 12A and 12B are simplified block diagrams of a mobile computing device with which aspects of the present technology may be practiced.
Figure 12B:
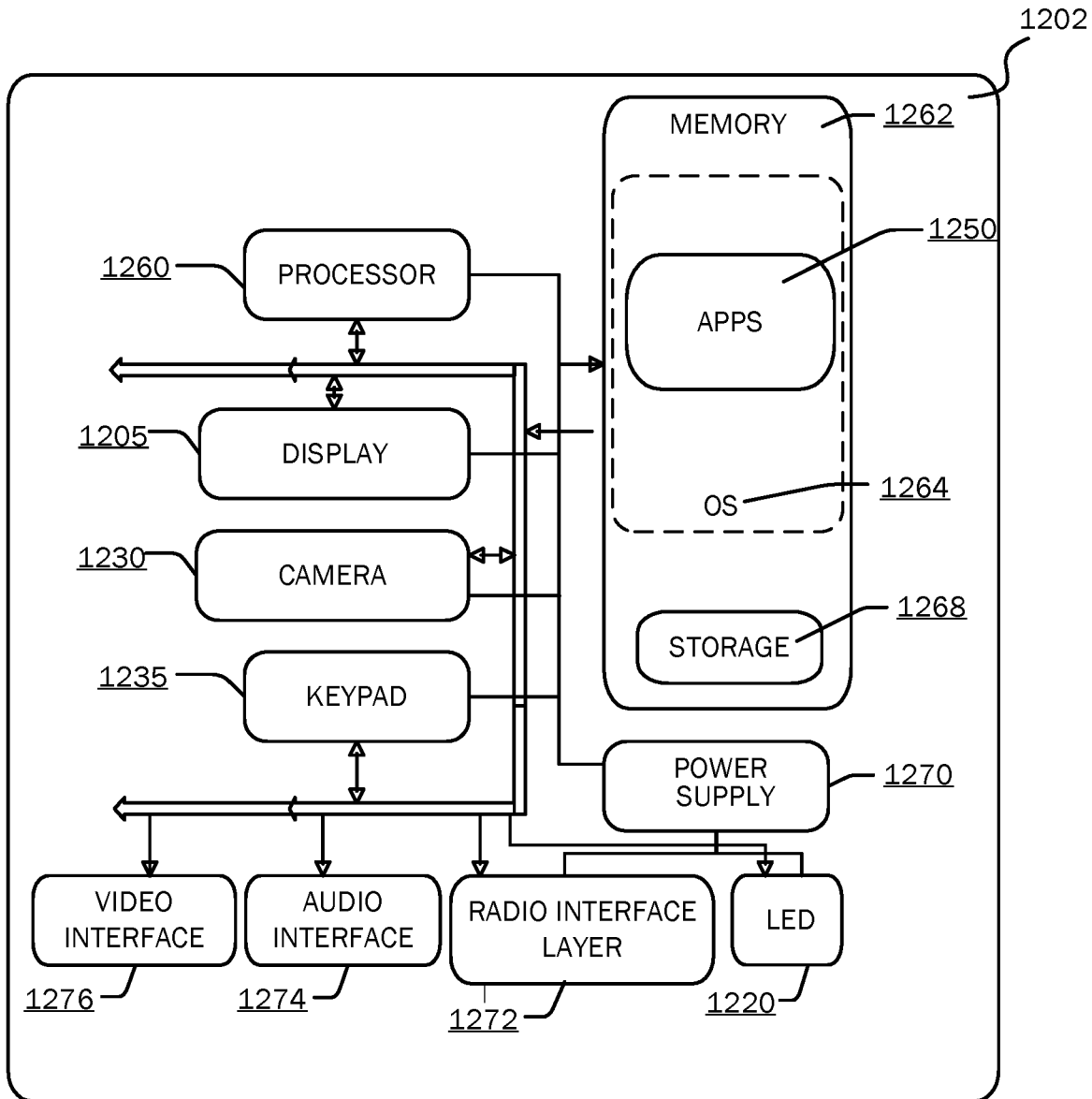

FIGS. 12A and 12B illustrate a mobile computing device 1200, for example, a mobile telephone, a smart phone, a tablet personal computer, a laptop computer, and the like, with which aspects of the invention may be practiced. The mobile device 1200 may be one example of the client device discussed above. With reference to FIG. 12A, an example of a mobile computing device 1200 for implementing at least some aspects of the present technology is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative examples, mobile computing device 1200 may incorporate more or less input elements. For example, the display 1205 may not be a touch screen in some examples. In alternative examples, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various aspects, the output elements include the display 1205 for showing a graphical user interface (GUI), a visual indicator 1220 (e.g., a light emitting diode), and/or an audio transducer 1225 (e.g., a speaker). In some examples, the mobile computing device 1200 incorporates a vibration transducer for providing the user with tactile feedback. In yet another example, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one example of a mobile computing device. That is, the mobile computing device 1200 can incorporate a system (i.e., an architecture) 1202 to implement some examples. In one example, the system 1202 is implemented as a "smart phone" capable of running one or more applications (e.g., videoconference or virtual meeting application, browser, e-mail, calendaring, contact managers, messaging clients, games, and media clients/players). In some examples, the system 1202 is integrated as a computing device, such as an integrated personal digital assistant (PDA) and wireless phone.

One or more application programs 1250 may be loaded into the memory 1262 and run on or in association with the operating system 1264. Examples of the application programs include videoconference or virtual meeting programs, phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1250 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at a remote device or server. As should be appreciated, other applications may be loaded into the memory 1262 and run on the mobile computing device 1200.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1250 via the operating system 1264, and vice versa.

The visual indicator 1220 may be used to provide visual notifications and/or an audio interface 1274 may be used for producing audible notifications via the audio transducer 1225. In the illustrated example, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

As should be appreciated from the foregoing, the present technology provides multiple technical benefits and solutions to technical problems. For instance, generating a single result set from multiple distributed data stores generally faces multiple technical problems. For instance, one technical problem includes keeping the correct sort order for the result set when the results are merged from the multiple data stores. The present technology provides a merge process, as discussed above, that consistently merges the data items from multiple stores in a repeatable manner that also reduces the overall use of computing resources. For instance, the results that are received from each shard may be limited to the page size, which results in reduced bandwidth use. Further, the merging of data items also stops once a full page is generated, which results in conservation of processing power. Additional technical problems include providing pagination support for the merged data and tracking the location for each data store for the next page. With the present technology, the pagination and tracking may be achieved in a stateless manner. For instance, by using the watermark instead of a cache, a reduced memory footprint may be achieved. The use of the merge process along with the watermark also causes improved accuracy and completeness of the delivered results.

In an aspect, the technology relates to a system for efficiently querying distributed data. The system includes a processor; and memory storing instructions that, when executed by the processor, cause the system to perform operations. The operations include receiving a query from a device; transmitting the query to multiple distributed data stores; receiving, from the data stores, first data items satisfying the query; generating first-page results from the first data items; based on the first-page results, generating a first-page watermark; transmitting the first-page results and the first-page watermark to the device; receiving a second-page request from the device, the second-page request including the query and the first-page watermark; transmitting the query and at least a portion of the first-page watermark to the data stores; receiving, from the data stores, second data items satisfying the query and the portion of the first-page watermark; generating second-page results from the received second data items; and transmitting the second-page results to the device.

In an example, the first-page watermark includes a filter portion and a skip portion, and the portion of the first-page watermark transmitted with the query to the multiple distributed data stores is the filter portion. In a further example, the second data items include data items provided in the first-page results, and the second data items that were provided in the first-page results skipped according to the skip portion such that they are not included in the second-page results. In another example, the operations further include generating a second-page watermark based on the second-page results; and transmitting the second-page watermark to the device with the second-page results. In yet another example, the query indicates a sort field and generating the first-page results includes (1) moving a top data item, from each result set of the first data items received from the data stores, into an ordered array ordered based on the sort field; (2) moving a top data from the ordered array to the first-page results, the top data item being from a particular data store of the data stores; (3) moving a top data item, from remaining data items in the result set from the particular data store, into the ordered array; and (4) repeating operations (2) and (3) until the first-page results include data items equal to a page size. In still another example, the ordered array is a heap.

In another example, the page size is indicated in the query. In yet another example, generating the first-page watermark comprises, once the first-page results include data items equal to the page size, comparing a value for the sort field of a last data item in the first-page results to a value for the sort field of the top data item in the ordered array. In a further example, the value for the sort field of the last data item in the first-page results is not equal to the value for the sort field of the top data item in the ordered array; and the first-page watermark includes a greater-than or a less-than expression having an expression value equal to the value for the sort field of the last data item in the first-page results. In yet another example, the value for the sort field of the last data item in the first-page results is equal to the value for the sort field of the top data item in the ordered array; the first-page watermark includes a greater-than-or-equal or a less-than-or-equal expression having an expression value equal to the value for the sort field of the last data item in the first-page results; and the first-page watermark includes a skip portion having a skip count value equal to a number of data items in the first-page results having a same value for the sort field as the last data item in the first-page results.

In another aspect, the technology relates to a computer-implemented method for efficiently querying distributed data. The method includes receiving a query from a device, the query indicating a page size and a sort field corresponding to a property of data items stored across multiple distributed data stores; transmitting the query to the distributed data stores, the query requesting a number of data items equal to the page size; receiving, from the data stores, first data items satisfying the query; generating first-page results from the first data items ordered based on the sort field; based on the first-page results, generating a first-page watermark including a filter portion indicating data items to be filtered for a subsequent page request and a skip portion having a skip count value indicating a number of data items to be skipped in generating subsequent page results; transmitting the first-page results and the first-page watermark to the device; receiving a second-page request from the device, the second-page request including the query and the first-page watermark; modifying the query to incorporate the filter portion and increase a number of requested data items to be equal to the page size plus the skip count value; transmitting the modified query to the data stores; receiving, from the data stores, second data items satisfying the modified query; generating second-page results from the received second data items; and transmitting the second-page results to the device.

In an example, generating the first-page results comprising moving a subset of the first data items to an ordered array and moving data items from the ordered array to the first-page results until the first-page results reach the page size. In another example, the method further includes upon receiving the first data items, temporarily storing the first data items; and upon transmitting the first-page results to the device, deleting the first data items from storage. In still another example, generating the first-page watermark comprises comparing, once the first-page results include data items equal to the page size, a value for the sort field of a last data item in the first-page results to a value for the sort field of a top data item in the ordered array. In yet another example, the filter portion of the first-page watermark include an expression value equal to a value of the sort field of a last data item in the first-page results. In still another example, the skip portion includes a skip count value equal to a number of data items in the first-page results having a value of the sort field equal to the value of the sort field of the last data item in the first-page results.

In another aspect, the technology relates to a computer-implemented method for efficiently querying distributed data. The method includes receiving a query from a client device, the query indicating a page size and a sort field corresponding to a property of data items stored across multiple distributed data stores; transmitting the query to the distributed data stores; receiving, from the data stores, first data items satisfying the query, wherein a number of data items received from each data store is equal to the page size; generating first-page results from the first data items ordered based on the sort field. Generating the first-page results includes (1) moving a top data item, from each result set of the first data items received from the data stores, into an ordered array ordered based on the sort field; (2) moving a top data from the ordered array to the first-page results, the top data item being from a particular data store of the data stores; (3) moving a top data item, from remaining data items in the result set from the particular data store, into the ordered array; and (4) repeating operations (2) and (3) until the first-page results include data items equal to the page size. The method further includes once the first-page results include data items equal to the page size, generating a first-page watermark by comparing a value for the sort field of a last data item in the first-page results to a value for the sort field of the top data item in the ordered array; and transmitting the first-page results and the first-page watermark to the client device.

In an example, the method further includes receiving a second-page request from the client device, the second-page request including the query and the first-page watermark; modifying the query based on the first-page watermark; transmitting the modified query to the data stores; receiving, from the data stores, second data items satisfying the modified query; generating second-page results from the received second data items; and transmitting the second-page results to the client device. In still another example, the method further includes generating a second-page watermark; transmitting the second-page watermark to the client device with the second-page results; and receiving a third-page request from the client device, the third-page request including the query and the second-page watermark. In yet another example, the method further includes upon receiving the first data items, temporarily storing the first data items; and upon transmitting the first-page results to the client device, deleting the first data items from storage.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A system for efficiently querying distributed data, the system comprising:
a processor; and memory storing instructions that, when executed by the processor, cause the system to perform operations comprising:
receiving a query from a device, wherein the query indicates a sort field;
transmitting the query to multiple distributed data stores;
receiving, from the data stores, first data items satisfying the query;
generating first-page results from the first data items, wherein the generating the first-page results comprises:
(1) moving a top data item, from each result set of the first data items received from the data stores, into an ordered array ordered based on the sort field;
(2) moving a top data from the ordered array to the first-page results, the top data item being from a particular data store of the data stores;
(3) moving a top data item, from remaining data items in the result set from the particular data store, into the ordered array; and
(4) repeating operations (2) and (3) until the first-page results include data items equal to a page size;
based on the first-page results, generating a first-page watermark;
transmitting the first-page results and the first-page watermark to the device; receiving a second-page request from the device, the second-page request including the query and the first-page watermark;
transmitting the query and at least a portion of the first-page watermark to the data stores;
receiving, from the data stores, second data items satisfying the query and the portion of the first-page watermark;
generating second-page results from the received second data items; and transmitting the second-page results to the device.

2. The system of claim 1, wherein the first-page watermark includes a filter portion and a skip portion, and the portion of the first-page watermark transmitted with the query to the multiple distributed data stores is the filter portion.

3. The system of claim 2, wherein the second data items include data items provided in the first-page results, and the second data items that were provided in the first-page results skipped according to the skip portion such that they are not included in the second-page results.

4. The system of claim 1, wherein the operations further comprise:
    generating a second-page watermark based on the second-page results; and
    transmitting the second-page watermark to the device with the second-page results.

5. The system of claim 1, wherein the ordered array is a heap.

6. A The system of claim 1, wherein the page size is indicated in the query.

7. The system of claim 1, wherein generating the first-page watermark comprises, once the first-page results include data items equal to the page size, comparing a value for the sort field of a last data item in the first-page results to a value for the sort field of the top data item in the ordered array.

8. The system of claim 7, wherein:
    the value for the sort field of the last data item in the first-page results is not equal to the value for the sort field of the top data item in the ordered array; and
    the first-page watermark includes a greater-than or a less-than expression having an expression value equal to the value for the sort field of the last data item in the first-page results.

9. The system of claim 7, wherein:
    the value for the sort field of the last data item in the first-page results is equal to the value for the sort field of the top data item in the ordered array;
    the first-page watermark includes a greater-than-or-equal or a less-than-or-equal expression having an expression value equal to the value for the sort field of the last data item in the first-page results; and
    the first-page watermark includes a skip portion having a skip count value equal to a number of data items in the first-page results having a same value for the sort field as the last data item in the first-page results.

10. A computer-implemented method for efficiently querying distributed data, the method comprising:
    receiving a query from a device, the query indicating a page size and a sort field corresponding to a property of data items stored across multiple distributed data stores;
    transmitting the query to the distributed data stores, the query requesting a number of data items equal to the page size;
    receiving, from the data stores, first data items satisfying the query;
    generating first-page results from the first data items ordered based on the sort field, wherein the generating the first-page results comprises:
    (1) moving a top data item, from each result set of the first data items received from the data stores, into an ordered array ordered based on the sort field;
    (2) moving a top data from the ordered array to the first-page results, the top data item being from a particular data store of the data stores;
    (3) moving a top data item, from remaining data items in the result set from the particular data store, into the ordered array; and
    (4) repeating operations (2) and (3) until the first-page results include data items equal to a page size;
    based on the first-page results, generating a first-page watermark including a filter portion indicating data items to be filtered for a subsequent page request and a skip portion having a skip count value indicating a number of data items to be skipped in generating subsequent page results;
    transmitting the first-page results and the first-page watermark to the device;
    receiving a second-page request from the device, the second-page request including the query and the first-page watermark;
    modifying the query to incorporate the filter portion and increase a number of requested data items to be equal to the page size plus the skip count value;
    transmitting the modified query to the data stores;
    receiving, from the data stores, second data items satisfying the modified query;
    generating second-page results from the received second data items; and
    transmitting the second-page results to the device.

11. The computer-implemented method of claim 10, wherein generating the first-page results comprising moving a subset of the first data items to an ordered array and moving data items from the ordered array to the first-page results until the first-page results reach the page size.

12. The computer-implemented method of claim 11, further comprising:
    upon receiving the first data items, temporarily storing the first data items; and
    upon transmitting the first-page results to the device, deleting the first data items from storage.

13. The computer-implemented method of claim 11, wherein generating the first-page watermark comprises comparing, once the first-page results include data items equal to the page size, a value for the sort field of a last data item in the first-page results to a value for the sort field of a top data item in the ordered array.

14. The computer-implemented method of claim 10, wherein the filter portion of the first-page watermark includes an expression value equal to a value of the sort field of a last data item in the first-page results.

15. The computer-implemented method of claim 14, wherein the skip portion includes a skip count value equal to a number of data items in the first-page results having a value of the sort field equal to the value of the sort field of the last data item in the first-page results.

16. A computer-implemented method for efficiently querying distributed data, the method comprising:
    receiving a query from a client device, the query indicating a page size and a sort field corresponding to a property of data items stored across multiple distributed data stores;
    transmitting the query to the distributed data stores;
    receiving, from the data stores, first data items satisfying the query, wherein a number of data items received from each data store is equal to the page size;
    generating first-page results from the first data items ordered based on the sort field, wherein generating the first-page results comprises:
    (1) moving a top data item, from each result set of the first data items received from the data stores, into an ordered array ordered based on the sort field;
    (2) moving a top data from the ordered array to the first-page results, the top data item being from a particular data store of the data stores;

(3) moving a top data item, from remaining data items in the result set from the particular data store, into the ordered array; and (4) repeating operations (2) and (3) until the first-page results include data items equal to the page size;

once the first-page results include data items equal to the page size, generating a first-page watermark by comparing a value for the sort field of a last data item in the first-page results to a value for the sort field of the top data item in the ordered array;

transmitting the first-page results and the first-page watermark to the client device;

receiving a second-page request from the client device, the second-page request including the query and the first-page watermark;

modifying the query based on the first-page watermark;

transmitting the modified query to the data stores;

receiving, from the data stores, second data items satisfying the modified query;

generating second-page results from the received second data items; and transmitting the second-page results to the client device.

17. The computer-implemented method of claim 10, further comprising:

generating a second-page watermark;

transmitting the second-page watermark to the client device with the second-page results; and receiving a third-page request from the client device, the third-page request including the query and the second-page watermark.

18. The computer-implemented method of claim 16, further comprising:

upon receiving the first data items, temporarily storing the first data items; and upon transmitting the first-page results to the client device, deleting the first data items from storage.

* * * * *